United States Patent [19]

Nielsen

[11] 4,445,386

[45] May 1, 1984

[54] HERMETICALLY SEALED HIGH TEMPERATURE STRAIN GAGE

[75] Inventor: John M. Nielsen, Alliance, Ohio

[73] Assignee: The Babcock & Wilcox Company, New Orleans, La.

[21] Appl. No.: 356,054

[22] Filed: Mar. 8, 1982

[51] Int. Cl.³ .............................................. G01B 7/16
[52] U.S. Cl. .................................................... 73/780
[58] Field of Search .................... 73/780, 800, 862.62, 73/763, 774, 775

[56] References Cited

U.S. PATENT DOCUMENTS 4,175,428 11/1979 Eilersen ........................... 73/780 X Primary Examiner—Jerry W. Myracle
Attorney, Agent, or Firm—Vytas R. Matas; Robert J. Edwards

[57] ABSTRACT

A hermetically sealed strain gage for measuring strains of high temperature parts comprises an attachment shim plate which is adapted to be secured to the part to be measured. A first inner cylinder member has one end sealingly secured to the shim plate and a second outer cylindrical member is disposed over the first member and has an end which is also sealingly secured to the shim plate. The outer wall of the inner member is spaced from the inner wall of the outer member and first and second spaced apart capacitor plates are arranged at substantially diametrically opposite sides of the inner cylinder member in spaced relationship to each other. A cover plate is sealingly secured to the opposite ends of the inner and outer cylinder members and closes the space between these members. Capacitors are connected electrically outwardly through conductors in a lead wire and the changes of the capacitance caused by the shift in positions of the plates due to the strain provide some indication of the strain involved. Other sensing devices such as photoelectric arrangements may be used to sense the variation in position of the capacitor plates.

10 Claims, 9 Drawing Figures

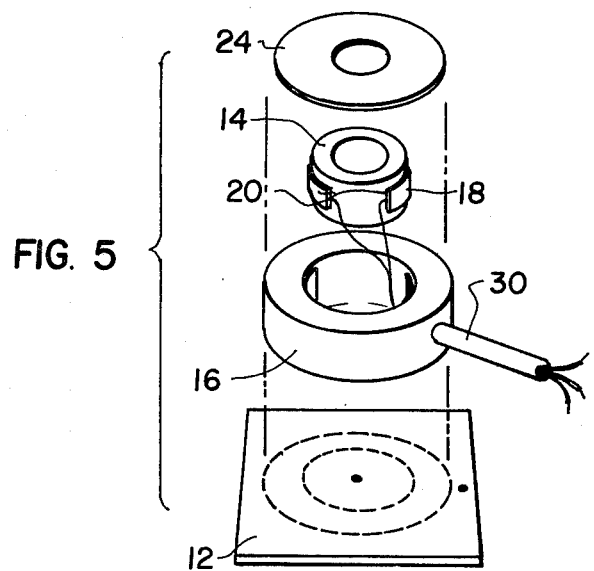
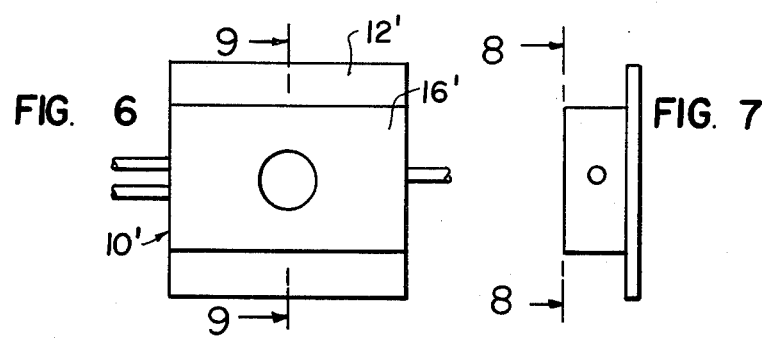
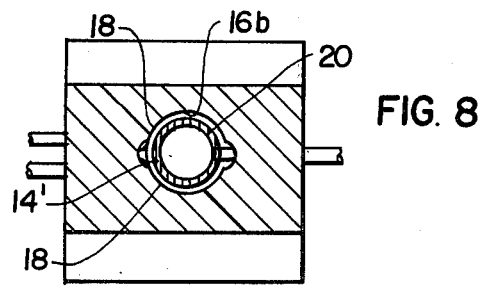

HERMETICALLY SEALED HIGH TEMPERATURE STRAIN GAGE

FIELD AND BACKGROUND OF THE INVENTION

This invention relates in general to gages and in particular to a new and useful gage which is hermetically sealed and adapted for use in high temperatures and in vapor atmosphere.

Recent advances in recorder electronics techniques make it possible to use the capacitance measurement as a strain gage measurement. An advantage of such a gage is that it can be used in elevated temperatures whereas none of the known devices are suitable for use in extremely high temperatures and in a water, steam or similar vapor environment.

SUMMARY OF THE INVENTION

In accordance with the invention there is provided a hermetically sealed capacitance strain gage wherein spaced apart capacitor plates are arranged in the spacing between inner and outer cylinder members which are sealed at each end. The plates are mounted on a shim or supporting plate which may be affixed to a part to be measured and a change in the dimension of the plate due to strain causes a corresponding movement of the capacitor plates and hence a change in capacitance which may be used as a measure of the strain. The same arrangement may also be used with photoelectric devices for indicating the change in the plate positions and hence the strain which is produced.

In the preferred arrangement of the invention two concentric cylinders are mounted on a shim support plate and sealed hermetically to the plate and they are spaced apart so that the space between accomodates preferably pairs of capacitor plates arranged at diametrically opposite positions around the inner cylinder. The plates are preferably mounted so that the inner capacitive plate of each set is secured to the outer wall of the inner cylinder and the outer one of each set is secured to the inner wall of the outer cylinder, preferably by a non-conductive adhesive. The cylinder members are sized and concentrically positioned relative to each other so that approximately parallel plate capacitors may be formed on opposite sides of the inner cylinder, that is at diametrically opposite locations. Proper concentric positioning of the cylinders is maintained by seal welding the bottom endof each cylinder to the attachment shim. The opposite ends of the cylinders are hermetically sealed by welding a cover plate ring having an inner opening concentrically positioned over the bore of the inner cylinder. Advantageously however the cover may be made to conform to the bore of the inner cylinder by providing a central part which projects through the cylinder and is secured to the shim plate and a skirt which extends over the outer cylinder exterior wall.

Accordingly it is an object of the invention to provide an improved strain gage which is operable at a high temperatures and in a hostile environment such as liquid sodium-or vapor conditions.

A further object of the invention is to provide a strain gage which includes inner and outer members arranged one over the other with a space therebetween having a pair of capacitor plates arranged in spaced parallel relationship on respective opposite sides of the inner cylinder and including a cover closing the opposite end of the space between the two cylinders and wherein the mounting or shim plate is employed for fixing the device to a part to be measured so that movements of the inner and outer cylinders effected through strain induced in the mounting plate will register as a change in position of the capacitor plates or a change in a capacitance.

A further object of the invention is to provide a strain gage which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which preferred embodiments of the invention are illustrated.

BRIEF DESCRIPTION OF THE DRAWINGS

In the Drawings:

FIG. 5 is an exploded perspective view of a modified embodiment of the invention;

FIG. 6 is a top plan view similar to FIG. 1 of another embodiment of the invention;

FIG. 7 is an end elevational view of the embodiment shown in FIG. 6;

FIG. 8 is a section taken along the line 8—8 of FIG. 7;

DETAILED DESCRIPTION OF THE PREFERRED EMBODIMENTS

Figure 1:
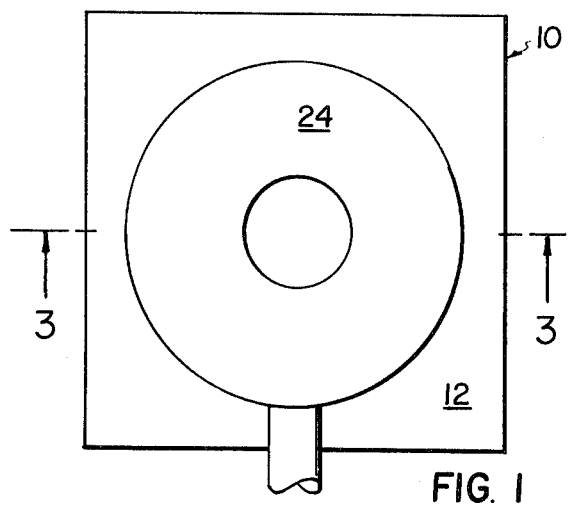
FIG. 1 is a top plan view of a strain gage constructed in accordance with the invention.
Figure 2:
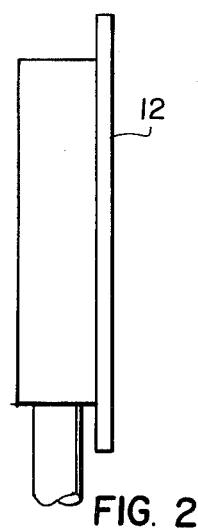
FIG. 2 is an end elevational view of a strain gage shown in FIG. 1.
Figure 3:
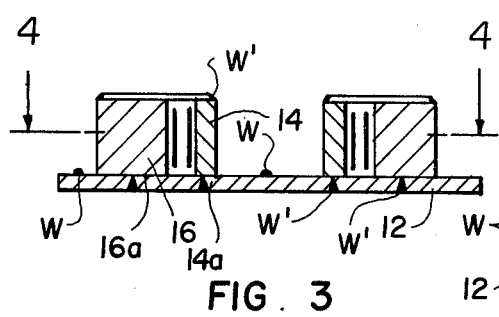
FIG. 3 is a section taken along the line 3—3 of FIG. 1.

Referring to the drawings in particular the invention embodied therein comprises a hermetically sealed high temperature strain gage generally designated 10 particularly for measuring strains of high temperature parts or parts disposed in a vapor atmosphere and it comprises an attachment shim plate 12 which is adapted to be secured to a part whose strain is to be measured for example by spot welding attachments as indicated by W. The first inner cylinder member 14 has one end 14a which is secured to the attachment shim plate 12 and this is effected for example by electron beam seal weld W'. Similarly an outer cylinder member 16 is arranged over the inner member 14 as one end 16a which is sealingly secured to the shim plate 12 by electron beam seal welds W'.

In accordance with the invention first and second sets of spaced apart capacitor plates 18 and 20 are arranged at substantially diametrically oposite positions around the inner cylinder 14 and they are connected by electrically conductive lead wires 18a and 20a through a sheath lead wire 22 which extends through the outer cylinder 16. A cover plate 24 is disposed over the ends of the inner and outer cylinders which are opposite to the attachment shim plates and is sealingly secured thereto such as by seal welds W' which extend around the inner and outer periphery of the cover plate and ring member 24.

Figure 4:
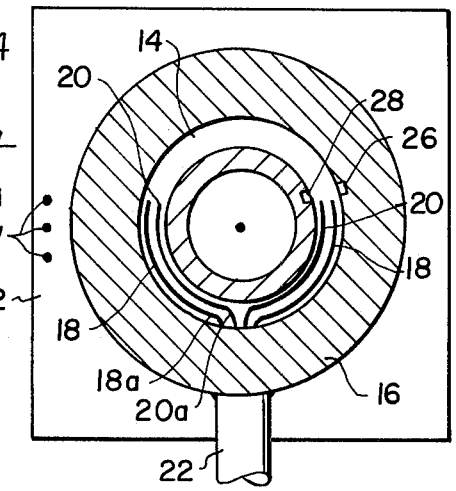
FIG. 4 is a section taken along the line 4—4 of FIG. 3.

In accordance with the invention the sheath lead wire 22 contains electrical conductors which supply electrical energy and means for sensing the change of capacitance caused by movement of the capacitor plates 18 and 20 when the part being measured is subject to strain. Sensing means which is associated with the capacitor plates 18 and 20 may comprise suitable electric instrumentation for sensing the various capacitance changes which occur during strain measurement and for this purpose the separate pairs of capacitors may be measured together in a half-bridge arrangement or separately as desired. In FIG. 4 a variation of sensing means for sensing the capacitor plate changes comprises photoelectric devices 26 and 28 locating in the path of movement of the plates 18 and 20 for sensing the plate variations.

In the embodiment shown in FIG. 5 all of the parts are similarly made and similarly designated to that of the other embodiment but the capacitor plates 18 and 20 are connected to sensing means 22 associated with a sheath lead wire for indicating changes in capacitance during strain measurement.

Figure 9:
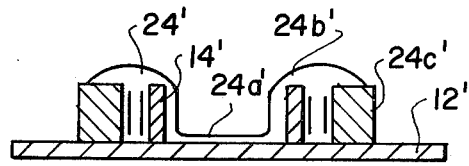
FIG. 9 is a section taken along the line 9—9 of FIG. 6.

In the embodiments shown in FIGS. 6 to 9 strain gage 10' includes an attachment shim plate 12' and an outer member 16' in the form of a block having a central bore 16b which defines an inner wall spaced outwardly from an inner member 14'. In this embodiment capacitor plates 18 are shown as being affixed to the bore 16b of the outer member and plates 20 are shown as being affixed to the exterior wall of the inner member 14' and in both instances a non-conductive adhesive is employed. As shown in FIG. 9 a cover 24' comprises central portion 24'a which overlies the central area of the shim plate 12' within the bore of the inner member 14' so that an intermediate part 24'b which extends over the outer end of the inner and outer members and an outer part 24'c which may be conformed to the outer surface of the outer member and sealed thereto.

the inner member 14 is advantageously positioned concentrically within the outer member 16 and the small capacitor plates 18 and 20 are advantageously attached to the associated inner and outer members at 180° spacing. This insures that the plates 18 and 20 are substantially parallel. Once this concentric arrangement is made and the cylinders secured to the attachment shim plate 12 the whole arrangement may be completely hermetically sealed by applying the cover 24. A gage of this type has sensitivity as good as the known resistance gages and it functions generally by movement of the inner cylinder relative to the outer cylinder during strain of the part to which the attachment plate 12 is spot welded. The strain amount is advantageously determined with the gage using a predetermined constant and by monitoring the capacitance change which is produced by movement of the inner cylinder relative to the outer cylinder.

A device constructed in accordance with the invention has been tested and it has been found that the gage does not become affected by stray capacitance change because of its hermetic sealing. The construction also provides a very rugged gage which will withstand atmospheric changes and rough use. The gage is such that it can be used as a strain rosette or used to measure strain in three different directions.

While specific embodiments of the invention have been shown and described in detail to illustrate the application of the principles of the invention, it will be understood that the invention may be embodied otherwise without departing from such principles.

What is claimed is:-

1. A hermetically sealed strain gage measuring strains of high temperature parts, comprising an attachement shim plate, a first inner member having one end sealingly secured to said shim plate, a second outer member disposed over said inner member and having one end sealingly secured to said shim plate, said second outer member having an outer wall and said outer member having an inner wall spaced from said first inner member outer wall, first and second spaced apart pairs of capacitor plates disposed between said outer wall of said first inner member and said inner wall of said second outer member and arranged at substantially diametrically opposite positions, a cover plate sealingly secured to the opposite ends of said inner and outer members closing the space between said inner and outer members, and sensing means associated with said capacitor plates responsive to change of movement of said plates to indicate stress of the part.

2. A hermetically sealed strain gage for measuring strains of high temperature parts, comprising an attachment shim plate, a first inner member having one end sealingly secured to said shim plate, a second outer member disposed over said inner member and having one end sealingly secured to said shim plate, said second outer member having an outer wall and said outer member having an inner wall spaced from said first inner member outer wall, first and second spaced capacitor plates disposed between said outer wall of said first innner member and said inner wall of said second outer member, a cover plate sealingly secured to the opposite ends of said inner and outer members closing the space between said inner and outer members, and sensing means associated with said capacitor plates responsive to change of movement of said plates to indicate stress of the part.

3. A hermetically sealed strain gage according to claim 2, including means for insulating said capacitor plates from the associated inner and outer members.

4. A hermetically sealed strain gage according to claim 2, including electron beam seal welds established between said attachment shim plate and each of said outer and inner members of said cover and said outer and inner members and sealing the space between said outer and inner members at each end thereof.

5. A hermetically sealed strain gage according to claim 2, wherein said sensing means associated with said capacitor plates comprises an electrical connection to said plates for sensing changes of capacitance therof.

6. A hermetically sealed strain gage according to claim 2, wherein said sensing means for sensing the changes of said capacitor plates comprises a light sensitive member disposed in the path of movement of said plates.

7. A hermetically sealed strain gage according to claim 2, wherein said sensing means comprises a sheath lead wire extending through said outer member and containing electrical conductors which are connected to said capacitor plates.

8. A hermetically sealed strain gage according to claim 2, wherein said cover comprises a ring member having a central opening overlying the bore of said inner member, said inner and outer members comprising cylinders.

9. A hermetically sealed strain gage according to claim 2, wherein said outer member comprises a rectangular block member having a central cylindrical bore, said inner member being concentrically arranged within said outer member.

10. A hermetically sealed strain gage according to claim 2, wherein said cover comprises a member having a central portion disposed within the bore of said inner member, said intermediate portion extending over said inner member to said outer member and being connected at its outer periphery to said outer member.

* * * * *